United States Patent
Leong et al.

(10) Patent No.: US 9,997,304 B2
(45) Date of Patent: Jun. 12, 2018

(54) UNIFORM ILLUMINATION OF KEYS

(71) Applicant: Apple Inc., Cupertino, CA (US)

(72) Inventors: Craig C. Leong, Cupertino, CA (US);
Bradford J. Zercoe, Cupertino, CA (US); Dinesh C. Mathew, Cupertino, CA (US); Mahesh Krishnamurthi, Cupertino, CA (US); Robert Y. Cao, Cupertino, CA (US); Jun Qi, Cupertino, CA (US); Rong Liu, Cupertino, CA (US); Victor H. Yin, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days. days.

(21) Appl. No.: 15/154,723

(22) Filed: May 13, 2016

(65) Prior Publication Data
US 2016/0336124 A1    Nov. 17, 2016

Related U.S. Application Data (60) Provisional application No. 62/161,038, filed on May 13, 2015.

(51) Int. Cl.
*H01H 13/02* (2006.01)
*H01H 13/83* (2006.01)
(Continued)

(52) U.S. Cl.
CPC .......... *H01H 13/023* (2013.01); *H01H 13/14* (2013.01); *H01H 13/83* (2013.01);
(Continued)

(58) Field of Classification Search
CPC ...... H01H 13/023; H01H 13/14; H01H 13/83; H01H 2219/048; H01H 2219/062; H01H 2219/0622; H01H 9/16; H01H 2233/07; H01H 2233/078; H01H 2221/07; H01H 2219/56; H01H 2219/016; H01H 3/12; G06F 3/0202
(Continued)

(56) References Cited

U.S. PATENT DOCUMENTS

| | | |
|---|---|---|
| 3,657,492 A | 4/1972 | Arndt et al. |
| 3,917,917 A | 11/1975 | Murata |

(Continued)

FOREIGN PATENT DOCUMENTS

| | | |
|---|---|---|
| CN | 2155620 | 2/1994 |
| CN | 2394309 | 8/2000 |

(Continued)

OTHER PUBLICATIONS

Elekson, "Reliable and Tested Wearable Electronics Embedment Solutions," http://www.wearable.technology/our-technologies, 3 pages, at least as early as Jan. 6, 2016.

*Primary Examiner* — Edwin A. Leon
(74) *Attorney, Agent, or Firm* — Brownstein Hyatt Farber Schreck, LLP (57) ABSTRACT

Systems and methods for providing illumination to illuminable portions of keys associated with a keyboard are described. A key includes a light guide positioned below a keycap. The light guide includes one or more sidewalls that exhibit high internal reflection. In many examples, light guide sidewalls are formed with one or more prisms.

22 Claims, 8 Drawing Sheets

(51) Int. Cl.
*H01H 13/14* (2006.01)
*G06F 3/02* (2006.01)

(52) U.S. Cl.
CPC ..... *G06F 3/0202* (2013.01); *H01H 2219/048* (2013.01); *H01H 2219/062* (2013.01); *H01H 2219/0622* (2013.01)

(58) Field of Classification Search
USPC ........ 200/308, 310–315, 512–521, 5 A, 341, 200/344–345
See application file for complete search history.

(56) References Cited

U.S. PATENT DOCUMENTS

| | | |
|---|---|---|
| 3,978,297 A | 8/1976 | Lynn et al. |
| 4,095,066 A | 6/1978 | Harris |
| 4,319,099 A | 3/1982 | Asher |
| 4,349,712 A | 9/1982 | Michalski |
| 4,484,042 A | 11/1984 | Matsui |
| 4,596,905 A | 6/1986 | Fowler |
| 4,598,181 A | 7/1986 | Selby |
| 4,670,084 A | 6/1987 | Durand et al. |
| 4,755,645 A | 7/1988 | Naoki et al. |
| 4,937,408 A | 6/1990 | Hattori et al. |
| 4,987,275 A | 1/1991 | Miller et al. |
| 5,021,638 A | 6/1991 | Nopper et al. |
| 5,092,459 A | 3/1992 | Uljanic et al. |
| 5,136,131 A | 8/1992 | Komaki |
| 5,278,372 A | 1/1994 | Takagi et al. |
| 5,280,146 A | 1/1994 | Inagaki et al. |
| 5,340,955 A | 8/1994 | Calvillo et al. |
| 5,382,762 A | 1/1995 | Mochizuki |
| 5,397,867 A | 3/1995 | Demeo |
| 5,408,060 A | 4/1995 | Muurinen |
| 5,421,659 A | 6/1995 | Liang |
| 5,422,447 A | 6/1995 | Spence |
| 5,457,297 A | 10/1995 | Chen |
| 5,477,430 A | 12/1995 | LaRose et al. |
| 5,481,074 A | 1/1996 | English |
| 5,504,283 A | 4/1996 | Kako et al. |
| 5,512,719 A | 4/1996 | Okada et al. |
| 5,625,532 A | 4/1997 | Sellers |
| 5,804,780 A | 9/1998 | Bartha |
| 5,828,015 A | 10/1998 | Coulon |
| 5,847,337 A | 12/1998 | Chen |
| 5,874,700 A | 2/1999 | Hochgesang |
| 5,876,106 A | 3/1999 | Kordecki et al. |
| 5,878,872 A | 3/1999 | Tsai |
| 5,881,866 A | 3/1999 | Miyajima et al. |
| 5,898,147 A | 4/1999 | Domzaiski et al. |
| 5,924,555 A | 7/1999 | Sadamori et al. |
| 5,935,691 A | 8/1999 | Tsai |
| 5,960,942 A | 10/1999 | Thornton |
| 5,986,227 A | 11/1999 | Hon |
| 6,020,565 A | 2/2000 | Pan |
| 6,068,416 A | 5/2000 | Kumamoto et al. |
| 6,215,420 B1 | 4/2001 | Harrison et al. |
| 6,257,782 B1 | 7/2001 | Maruyama et al. |
| 6,259,046 B1 | 7/2001 | Iwama et al. |
| 6,377,685 B1 | 4/2002 | Krishnan |
| 6,388,219 B2 | 5/2002 | Hsu et al. |
| 6,423,918 B1 | 7/2002 | King et al. |
| 6,482,032 B1 | 11/2002 | Szu et al. |
| 6,530,283 B2 | 3/2003 | Okada et al. |
| 6,538,801 B2 | 3/2003 | Jacobson et al. |
| 6,542,355 B1 | 4/2003 | Huang |
| 6,552,287 B2 | 4/2003 | Janniere |
| 6,556,112 B1 | 4/2003 | Van Zeeland et al. |
| 6,559,399 B2 | 5/2003 | Hsu et al. |
| 6,560,612 B1 | 5/2003 | Yamada et al. |
| 6,572,289 B2 | 6/2003 | Lo et al. |
| 6,573,463 B2 | 6/2003 | Ono |
| 6,585,435 B2 | 7/2003 | Fang |
| 6,624,369 B2 | 9/2003 | Ito et al. |
| 6,706,986 B2 | 3/2004 | Hsu |
| 6,750,414 B2 | 6/2004 | Sullivan |
| 6,759,614 B2 | 7/2004 | Yoneyama |
| 6,762,381 B2 | 7/2004 | Kunthady et al. |
| 6,765,503 B1 | 7/2004 | Chan et al. |
| 6,788,450 B2 | 9/2004 | Kawai et al. |
| 6,797,906 B2 | 9/2004 | Ohashi |
| 6,850,227 B2 | 2/2005 | Takahashi et al. |
| 6,860,660 B2 | 3/2005 | Hochgesang et al. |
| 6,911,608 B2 | 6/2005 | Levy |
| 6,926,418 B2 | 8/2005 | Ostergård et al. |
| 6,940,030 B2 | 9/2005 | Takeda et al. |
| 6,977,352 B2 | 12/2005 | Oosawa |
| 6,979,792 B1 | 12/2005 | Lai |
| 6,987,466 B1 | 1/2006 | Welch et al. |
| 6,987,503 B2 | 1/2006 | Inoue |
| 7,012,206 B2 | 3/2006 | Oikawa |
| 7,038,832 B2 | 5/2006 | Kanbe |
| 7,126,499 B2 | 10/2006 | Lin et al. |
| 7,129,930 B1 | 10/2006 | Cathey et al. |
| 7,134,205 B2 | 11/2006 | Bruennel |
| 7,146,701 B2 | 12/2006 | Mahoney et al. |
| 7,151,236 B2 | 12/2006 | Ducruet et al. |
| 7,151,237 B2 | 12/2006 | Mahoney et al. |
| 7,154,059 B2 | 12/2006 | Chou |
| 7,166,813 B2 | 1/2007 | Soma |
| 7,172,303 B2 | 2/2007 | Shipman et al. |
| 7,189,932 B2 | 3/2007 | Kim |
| 7,256,766 B2 | 8/2007 | Albert et al. |
| 7,283,119 B2 | 10/2007 | Kishi |
| 7,301,113 B2 | 11/2007 | Nishimura et al. |
| 7,312,790 B2 | 12/2007 | Sato et al. |
| 7,378,607 B2 | 5/2008 | Koyano et al. |
| 7,414,213 B2 | 8/2008 | Hwang |
| 7,429,707 B2 | 9/2008 | Yanai et al. |
| 7,432,460 B2 | 10/2008 | Clegg |
| 7,510,342 B2 | 3/2009 | Lane et al. |
| 7,531,764 B1 | 5/2009 | Lev et al. |
| 7,541,554 B2 | 6/2009 | Hou |
| 7,589,292 B2 | 9/2009 | Jung et al. |
| 7,639,187 B2 | 12/2009 | Caballero et al. |
| 7,651,231 B2 | 1/2010 | Chou et al. |
| 7,679,010 B2 | 3/2010 | Wingett |
| 7,781,690 B2 | 8/2010 | Ishii |
| 7,813,774 B2 | 10/2010 | Perez-Noguera |
| 7,842,895 B2 | 11/2010 | Lee |
| 7,847,204 B2 | 12/2010 | Tsai |
| 7,851,819 B2 | 12/2010 | Shi |
| 7,866,866 B2 | 1/2011 | Wahlstrom |
| 7,893,376 B2 | 2/2011 | Chen |
| 7,923,653 B2 | 4/2011 | Ohsumi |
| 7,947,915 B2 * | 5/2011 | Lee ......... H01H 13/83 200/314 |
| 7,999,748 B2 | 8/2011 | Ligtenberg et al. |
| 8,063,325 B2 | 11/2011 | Sung et al. |
| 8,080,744 B2 | 12/2011 | Yeh et al. |
| 8,109,650 B2 | 2/2012 | Chang et al. |
| 8,119,945 B2 | 2/2012 | Lin |
| 8,124,903 B2 | 2/2012 | Tatehata et al. |
| 8,134,094 B2 | 3/2012 | Tsao et al. |
| 8,143,982 B1 | 3/2012 | Lauder et al. |
| 8,156,172 B2 | 4/2012 | Muehl et al. |
| 8,178,808 B2 | 5/2012 | Strittmatter et al. |
| 8,184,021 B2 * | 5/2012 | Chou ......... H01H 13/83 200/310 |
| 8,212,160 B2 | 7/2012 | Tsao |
| 8,212,162 B2 | 7/2012 | Zhou |
| 8,218,301 B2 | 7/2012 | Lee |
| 8,232,958 B2 | 7/2012 | Tolbert |
| 8,246,228 B2 | 8/2012 | Ko et al. |
| 8,253,048 B2 * | 8/2012 | Ozias ......... H01H 13/83 200/314 |
| 8,253,052 B2 | 9/2012 | Chen |
| 8,263,887 B2 | 9/2012 | Chen et al. |
| 8,289,280 B2 | 10/2012 | Travis |
| 8,299,382 B2 | 10/2012 | Takemae et al. |
| 8,317,384 B2 | 11/2012 | Chung et al. |
| 8,319,298 B2 | 11/2012 | Hsu |
| 8,325,141 B2 | 12/2012 | Marsden |

(56) References Cited

U.S. PATENT DOCUMENTS

| | | |
|---|---|---|
| 8,330,725 B2 | 12/2012 | Mahowald et al. |
| 8,354,629 B2 | 1/2013 | Lin |
| 8,378,857 B2 | 2/2013 | Pance |
| 8,383,972 B2 | 2/2013 | Liu |
| 8,384,566 B2 | 2/2013 | Bocirnea |
| 8,404,990 B2 | 3/2013 | Lutgring et al. |
| 8,451,146 B2 | 3/2013 | Mahowald et al. |
| 8,431,849 B2 | 4/2013 | Chen |
| 8,436,265 B2 | 5/2013 | Koike et al. |
| 8,462,514 B2 | 6/2013 | Myers et al. |
| 8,500,348 B2 | 8/2013 | Dumont et al. |
| 8,502,094 B2 | 8/2013 | Chen |
| 8,542,194 B2 | 9/2013 | Akens et al. |
| 8,569,639 B2 | 10/2013 | Strittmatter |
| 8,575,632 B2 | 11/2013 | Kuramoto et al. |
| 8,581,127 B2 * | 11/2013 | Jhuang ................... H01H 13/83 200/314 |
| 8,592,699 B2 | 11/2013 | Kessler et al. |
| 8,592,702 B2 | 11/2013 | Tsai |
| 8,592,703 B2 | 11/2013 | Johnson et al. |
| 8,604,370 B2 | 12/2013 | Chao |
| 8,629,362 B1 | 1/2014 | Knighton et al. |
| 8,642,904 B2 | 2/2014 | Chiba et al. |
| 8,651,720 B2 | 2/2014 | Sherman et al. |
| 8,659,882 B2 | 2/2014 | Liang et al. |
| 8,731,618 B2 | 5/2014 | Jarvis et al. |
| 8,748,767 B2 * | 6/2014 | Ozias ................... G06F 1/1662 200/310 |
| 8,759,705 B2 | 6/2014 | Funakoshi et al. |
| 8,760,405 B2 | 6/2014 | Nam |
| 8,786,548 B2 | 7/2014 | Oh et al. |
| 8,791,378 B2 | 7/2014 | Lan |
| 8,835,784 B2 | 9/2014 | Hirota |
| 8,847,090 B2 | 9/2014 | Ozaki |
| 8,847,711 B2 | 9/2014 | Yang et al. |
| 8,853,580 B2 | 10/2014 | Chen |
| 8,854,312 B2 | 10/2014 | Meierling |
| 8,870,477 B2 | 10/2014 | Merminod et al. |
| 8,884,174 B2 * | 11/2014 | Chou ................... H01H 13/83 200/314 |
| 8,921,473 B1 | 12/2014 | Hyman |
| 8,922,476 B2 | 12/2014 | Stewart et al. |
| 8,976,117 B2 | 3/2015 | Krahenbuhl et al. |
| 8,994,641 B2 | 3/2015 | Stewart et al. |
| 9,007,297 B2 | 4/2015 | Stewart et al. |
| 9,012,795 B2 | 4/2015 | Niu et al. |
| 9,024,214 B2 | 5/2015 | Niu et al. |
| 9,029,723 B2 | 5/2015 | Pegg |
| 9,063,627 B2 | 6/2015 | Yairi et al. |
| 9,064,642 B2 | 6/2015 | Welch et al. |
| 9,086,733 B2 | 7/2015 | Pance |
| 9,087,663 B2 | 7/2015 | Los |
| 9,093,229 B2 | 7/2015 | Leong et al. |
| 9,213,416 B2 | 12/2015 | Chen |
| 9,223,352 B2 | 12/2015 | Smith et al. |
| 9,234,486 B2 | 1/2016 | Das et al. |
| 9,235,236 B2 | 1/2016 | Nam |
| 9,274,654 B2 | 3/2016 | Slobodin et al. |
| 9,275,810 B2 | 3/2016 | Pance et al. |
| 9,300,033 B2 | 3/2016 | Han et al. |
| 9,305,496 B2 | 4/2016 | Kimura |
| 9,405,369 B2 | 8/2016 | Modarres et al. |
| 9,412,533 B2 | 8/2016 | Hendren et al. |
| 9,443,672 B2 | 9/2016 | Martisauskas |
| 9,448,628 B2 | 9/2016 | Tan et al. |
| 9,448,631 B2 | 9/2016 | Winter et al. |
| 9,449,772 B2 | 9/2016 | Leong et al. |
| 9,471,185 B2 | 10/2016 | Guard |
| 9,477,382 B2 | 10/2016 | Hicks et al. |
| 9,502,193 B2 | 11/2016 | Niu et al. |
| 9,640,347 B2 | 5/2017 | Kwan et al. |
| 9,734,965 B2 | 8/2017 | Martinez et al. |
| 2002/0079211 A1 | 6/2002 | Katayama et al. |
| 2002/0093436 A1 | 7/2002 | Lien |
| 2002/0149835 A1 | 10/2002 | Kanbe |
| 2003/0169232 A1 | 9/2003 | Ito |
| 2006/0011458 A1 | 1/2006 | Purcocks |
| 2006/0020469 A1 | 1/2006 | Rast |
| 2006/0120790 A1 | 6/2006 | Chang |
| 2006/0181511 A1 | 8/2006 | Woolley |
| 2006/0243987 A1 | 11/2006 | Lai |
| 2007/0200823 A1 | 8/2007 | Bytheway et al. |
| 2007/0285393 A1 | 12/2007 | Ishakov |
| 2008/0131184 A1 | 6/2008 | Brown et al. |
| 2008/0136782 A1 | 6/2008 | Mundt et al. |
| 2008/0251370 A1 | 10/2008 | Aoki |
| 2009/0046053 A1 | 2/2009 | Shigehiro et al. |
| 2009/0103964 A1 | 4/2009 | Takagi et al. |
| 2009/0128496 A1 | 5/2009 | Huang |
| 2009/0262085 A1 | 10/2009 | Wassingbo et al. |
| 2010/0066568 A1 | 3/2010 | Lee |
| 2010/0109921 A1 | 5/2010 | Annerfors |
| 2010/0156796 A1 | 6/2010 | Kim et al. |
| 2010/0253630 A1 | 10/2010 | Homma et al. |
| 2011/0032127 A1 | 2/2011 | Roush |
| 2011/0056817 A1 | 3/2011 | Wu |
| 2011/0056836 A1 | 3/2011 | Tatebe et al. |
| 2011/0205179 A1 | 8/2011 | Braun |
| 2011/0267272 A1 | 11/2011 | Meyer et al. |
| 2011/0284355 A1 | 11/2011 | Yang |
| 2012/0012446 A1 | 1/2012 | Hwa |
| 2012/0090973 A1 | 4/2012 | Liu |
| 2012/0098751 A1 | 4/2012 | Liu |
| 2012/0286701 A1 | 11/2012 | Yang et al. |
| 2012/0298496 A1 | 11/2012 | Zhang |
| 2012/0313856 A1 | 12/2012 | Hsieh |
| 2013/0093500 A1 | 4/2013 | Bruwer |
| 2013/0100030 A1 | 4/2013 | Los et al. |
| 2013/0120265 A1 | 5/2013 | Horii et al. |
| 2013/0161170 A1 | 6/2013 | Fan et al. |
| 2013/0215079 A1 | 8/2013 | Johnson et al. |
| 2013/0270090 A1 | 10/2013 | Lee |
| 2014/0015777 A1 | 1/2014 | Park et al. |
| 2014/0027259 A1 | 1/2014 | Kawana et al. |
| 2014/0071654 A1 | 3/2014 | Chien |
| 2014/0082490 A1 | 3/2014 | Jung et al. |
| 2014/0090967 A1 | 4/2014 | Inagaki |
| 2014/0098042 A1 | 4/2014 | Kuo et al. |
| 2014/0118264 A1 | 5/2014 | Leong et al. |
| 2014/0151211 A1 | 6/2014 | Zhang |
| 2014/0184496 A1 | 7/2014 | Gribetz et al. |
| 2014/0191973 A1 | 7/2014 | Zellers et al. |
| 2014/0218851 A1 | 8/2014 | Klein et al. |
| 2014/0252881 A1 | 9/2014 | Dinh et al. |
| 2014/0291133 A1 | 10/2014 | Fu et al. |
| 2014/0375141 A1 | 12/2014 | Nakajima |
| 2015/0016038 A1 | 1/2015 | Niu et al. |
| 2015/0083561 A1 | 3/2015 | Han et al. |
| 2015/0090571 A1 | 4/2015 | Leong et al. |
| 2015/0270073 A1 | 9/2015 | Yarak, III et al. |
| 2015/0277559 A1 | 10/2015 | Vescovi et al. |
| 2015/0287553 A1 | 10/2015 | Welch et al. |
| 2015/0309538 A1 | 10/2015 | Zhang |
| 2015/0332874 A1 | 11/2015 | Brock et al. |
| 2015/0348726 A1 | 12/2015 | Hendren |
| 2015/0370339 A1 | 12/2015 | Ligtenberg et al. |
| 2015/0378391 A1 | 12/2015 | Huitema et al. |
| 2016/0049266 A1 | 2/2016 | Stringer et al. |
| 2016/0093452 A1 | 3/2016 | Zercoe et al. |
| 2016/0172129 A1 | 6/2016 | Zercoe et al. |
| 2016/0189890 A1 | 6/2016 | Leong et al. |
| 2016/0189891 A1 | 6/2016 | Zercoe et al. |
| 2016/0329166 A1 | 11/2016 | Hou et al. |
| 2016/0336127 A1 | 11/2016 | Leong et al. |
| 2016/0336128 A1 | 11/2016 | Leong et al. |
| 2016/0343523 A1 | 11/2016 | Hendren et al. |
| 2016/0351360 A1 | 12/2016 | Knopf et al. |
| 2016/0365204 A1 | 12/2016 | Cao et al. |
| 2016/0378234 A1 | 12/2016 | Ligtenberg et al. |
| 2016/0379775 A1 | 12/2016 | Leong et al. |
| 2017/0004937 A1 | 1/2017 | Leong et al. |
| 2017/0004939 A1 | 1/2017 | Kwan et al. |

(56) References Cited

U.S. PATENT DOCUMENTS

| | | |
|---|---|---|
| 2017/0011869 A1 | 1/2017 | Knopf et al. |
| 2017/0090106 A1 | 3/2017 | Cao et al. |
| 2017/0301487 A1 | 10/2017 | Leong et al. |

FOREIGN PATENT DOCUMENTS

| | | |
|---|---|---|
| CN | 1533128 | 9/2004 |
| CN | 1542497 | 11/2004 |
| CN | 2672832 | 1/2005 |
| CN | 1624842 | 6/2005 |
| CN | 1812030 | 8/2006 |
| CN | 1838036 | 9/2006 |
| CN | 1855332 | 11/2006 |
| CN | 101051569 | 10/2007 |
| CN | 200986871 | 12/2007 |
| CN | 101146137 | 3/2008 |
| CN | 201054315 | 4/2008 |
| CN | 201084602 | 7/2008 |
| CN | 201123174 | 9/2008 |
| CN | 201149829 | 11/2008 |
| CN | 101315841 | 12/2008 |
| CN | 201210457 | 3/2009 |
| CN | 101438228 | 5/2009 |
| CN | 101465226 | 6/2009 |
| CN | 101494130 | 7/2009 |
| CN | 101502082 | 8/2009 |
| CN | 201298481 | 8/2009 |
| CN | 101546667 | 9/2009 |
| CN | 101572195 | 11/2009 |
| CN | 101800281 | 8/2010 |
| CN | 101807482 | 8/2010 |
| CN | 201655616 | 11/2010 |
| CN | 102110542 | 6/2011 |
| CN | 102119430 | 7/2011 |
| CN | 201904256 | 7/2011 |
| CN | 102163084 | 8/2011 |
| CN | 201927524 | 8/2011 |
| CN | 201945951 | 8/2011 |
| CN | 201945952 | 8/2011 |
| CN | 201956238 | 8/2011 |
| CN | 102197452 | 9/2011 |
| CN | 202008941 | 10/2011 |
| CN | 202040690 | 11/2011 |
| CN | 102280292 | 12/2011 |
| CN | 102338348 | 2/2012 |
| CN | 102375550 | 3/2012 |
| CN | 202205161 | 4/2012 |
| CN | 102496509 | 6/2012 |
| CN | 10269527 | 8/2012 |
| CN | 102622089 | 8/2012 |
| CN | 102629526 | 8/2012 |
| CN | 202372927 | 8/2012 |
| CN | 102683072 | 9/2012 |
| CN | 202434387 | 9/2012 |
| CN | 202523007 | 11/2012 |
| CN | 102832068 | 12/2012 |
| CN | 102955573 | 3/2013 |
| CN | 102956386 | 3/2013 |
| CN | 102969183 | 3/2013 |
| CN | 103000417 | 3/2013 |
| CN | 103165327 | 6/2013 |
| CN | 103180979 | 6/2013 |
| CN | 203012648 | 6/2013 |
| CN | 203135988 | 8/2013 |
| CN | 103377841 | 10/2013 |
| CN | 103489986 | 1/2014 |
| CN | 203414880 | 1/2014 |
| CN | 103681056 | 3/2014 |
| CN | 103699181 | 4/2014 |
| CN | 203520312 | 4/2014 |
| CN | 203588895 | 5/2014 |
| CN | 103839715 | 6/2014 |
| CN | 103839720 | 6/2014 |
| CN | 103839722 | 6/2014 |
| CN | 103903891 | 7/2014 |
| CN | 103956290 | 7/2014 |
| CN | 203733685 | 7/2014 |
| CN | 104021968 | 9/2014 |
| CN | 204102769 | 1/2015 |
| CN | 204117915 | 1/2015 |
| CN | 104517769 | 4/2015 |
| CN | 204632641 | 9/2015 |
| CN | 105097341 | 11/2015 |
| DE | 2530176 | 1/1977 |
| DE | 3002772 | 7/1981 |
| DE | 29704100 | 4/1997 |
| EP | 0441993 | 8/1991 |
| EP | 1835272 | 9/2007 |
| EP | 1928008 | 6/2008 |
| EP | 2202606 | 6/2010 |
| EP | 2426688 | 3/2012 |
| EP | 2439760 | 4/2012 |
| EP | 2664979 | 11/2013 |
| FR | 2147420 | 3/1973 |
| FR | 2911000 | 7/2008 |
| FR | 2950193 | 3/2011 |
| GB | 1361459 | 7/1974 |
| JP | S50115562 | 9/1975 |
| JP | S60055477 | 3/1985 |
| JP | S61172422 | 10/1986 |
| JP | S62072429 | 4/1987 |
| JP | S63182024 | 11/1988 |
| JP | H0422024 | 4/1992 |
| JP | H0520963 | 1/1993 |
| JP | H0524512 | 8/1993 |
| JP | H05342944 | 12/1993 |
| JP | H09204148 | 8/1997 |
| JP | H10312726 | 11/1998 |
| JP | H11194882 | 7/1999 |
| JP | 2000010709 | 1/2000 |
| JP | 2000057871 | 2/2000 |
| JP | 2000339097 | 12/2000 |
| JP | 2001100889 | 4/2001 |
| JP | 2002260478 | 9/2002 |
| JP | 2002298689 | 10/2002 |
| JP | 2003522998 | 7/2003 |
| JP | 2005108041 | 4/2005 |
| JP | 2006164929 | 6/2006 |
| JP | 2006185906 | 7/2006 |
| JP | 2006521664 | 9/2006 |
| JP | 2006269439 | 10/2006 |
| JP | 2006277013 | 10/2006 |
| JP | 2006344609 | 12/2006 |
| JP | 2007115633 | 5/2007 |
| JP | 2007514247 | 5/2007 |
| JP | 2007156983 | 6/2007 |
| JP | 2008021428 | 1/2008 |
| JP | 2008041431 | 2/2008 |
| JP | 2008100129 | 5/2008 |
| JP | 2008191850 | 8/2008 |
| JP | 2008533559 | 8/2008 |
| JP | 2009099503 | 5/2009 |
| JP | 2009181894 | 8/2009 |
| JP | 2010061956 | 3/2010 |
| JP | 2010244088 | 10/2010 |
| JP | 2010244302 | 10/2010 |
| JP | 2011065126 | 3/2011 |
| JP | 2011150804 | 8/2011 |
| JP | 2011165630 | 8/2011 |
| JP | 2011524066 | 8/2011 |
| JP | 2012043705 | 3/2012 |
| JP | 2012063630 | 3/2012 |
| JP | 2012098873 | 5/2012 |
| JP | 2012134064 | 7/2012 |
| JP | 2012186067 | 9/2012 |
| JP | 2012230256 | 11/2012 |
| JP | 2014017179 | 1/2014 |
| JP | 2014216190 | 11/2014 |
| JP | 2014220039 | 11/2014 |
| KR | 1019990007394 | 1/1999 |
| KR | 1020020001668 | 1/2002 |
| KR | 100454203 | 10/2004 |
| KR | 1020060083032 | 7/2006 |
| KR | 1020080064116 | 7/2008 |

(56) References Cited

FOREIGN PATENT DOCUMENTS

| | | |
|---|---|---|
| KR | 1020080066164 | 7/2008 |
| KR | 2020110006385 | 6/2011 |
| KR | 1020120062797 | 6/2012 |
| KR | 1020130040131 | 4/2013 |
| KR | 20150024201 | 3/2015 |
| TW | 200703396 | 1/2007 |
| TW | M334397 | 6/2008 |
| TW | 201108284 | 3/2011 |
| TW | 201108286 | 3/2011 |
| TW | M407429 | 7/2011 |
| TW | 201246251 | 11/2012 |
| TW | 201403646 | 1/2014 |
| WO | WO9744946 | 11/1997 |
| WO | WO2005/057320 | 6/2005 |
| WO | WO2006/022313 | 3/2006 |
| WO | WO2007/049253 | 5/2007 |
| WO | WO2008/045833 | 4/2008 |
| WO | WO2009/005026 | 1/2009 |
| WO | WO2012/011282 | 1/2012 |
| WO | WO2012/027978 | 3/2012 |
| WO | WO2013/096478 | 6/2013 |
| WO | WO2014175446 | 10/2014 |

\* cited by examiner

UNIFORM ILLUMINATION OF KEYS

CROSS-REFERENCE TO RELATED APPLICATION

This application is a nonprovisional patent application of and claims the benefit of U.S. Provisional Patent Application No. 62/161,038, filed May 13, 2015 and titled "Uniform Illumination of Keys," the disclosure of which is hereby incorporated herein by reference in its entirety.

FIELD

Embodiments described herein are directed to input devices for computing systems and, more particularly, to systems and methods for facilitating substantially uniform illumination of select features of such input devices.

BACKGROUND

Electronic devices can receive user input from a keyboard, some keys of which may be illuminable and thus visible to a user in dimly-lit environments. A key can be illuminated in a number of ways. For example, a light-emitting diode ("LED") can be disposed behind a keycap of an illuminable key to direct light toward and through a translucent portion of the keycap. In many cases, the location, orientation, and size of such an LED is limited by the structure of the key itself, which, in turn, affects the quality, uniformity, and quantity of light visible to a user.

SUMMARY

Embodiments described herein disclose a keyboard including a group of keys. At least one key of the group of keys includes a compressible dome, a light emitting element, and a light guide that is positioned at least partially around the compressible dome and optically coupled to the light emitting element. Some embodiments may include an illuminable keycap positioned over the compressible dome In certain keys, the light guide includes a body that defines an inner sidewall, an outer sidewall, a top endcap surface, and a bottom endcap surface. The inner sidewall may exhibit greater internal reflection than the top endcap surface. The inner sidewall and the outer sidewall form one or more prisms.

Some embodiments take the form of a key for a keyboard, comprising: a keycap disposed within an aperture defined by the keyboard; a compressible dome positioned below the keycap; a key mechanism positioned around the compressible dome and coupled to the keycap; a structural body positioned beneath the key mechanism and formed from an optically translucent material, the structural body coupled to the key mechanism; and a light emitting element optically coupled to the structural body.

Other embodiments take the form of an input structure for an electronic device, comprising: an input surface comprising an illuminable portion; a collapsible dome positioned below the input surface; a depressible mechanism positioned around the collapsible dome and coupled to the input surface, the depressible mechanism configured to move the input surface downward to collapse the collapsible dome in response to an external force on the input surface; a body coupled to the depressible mechanism and the collapsible dome; a light guide positioned around the collapsible dome and within the body, the light guide optically coupled to the illuminable portion; and a light emitting element optically coupled to the light guide and configured to illuminate the illuminable portion through the light guide.

BRIEF DESCRIPTION OF THE DRAWINGS

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

The use of the same or similar reference numerals in different figures indicates similar, related, or identical items.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments described herein reference systems and methods that illuminate one or more keys of a keyboard. An illuminable key includes a light emitting element, such as a light-emitting diode, that is optically coupled to a light guide positioned beneath the key. The light guide conveys light from the light emitting element to an illuminable portion of the key.

As used herein, the phrase "illuminable portion of a key" refers generally to any or all areas of (or adjacent to) a keycap or other input surface that are intended to be illuminated such that the location, size, and/or functionality of that portion of the key is visually emphasized.

A glyph can be formed in an outer surface of a key from a translucent or transparent material to define an alphanumeric character, symbol, word, phrase, abbreviation, or any other linguistic, scientific, numeric, or pictographic symbol or set of symbols. In one example, the glyph itself illuminates upon activation of the light emitting element. In other examples, other portions of the key associated with the glyph illuminate upon activation of the light emitting element such as a glyph border, a glyph underline, a glyph outline, and so on. All are examples of illuminable portions of a key.

Another example of an illuminable portion of a key is the geometry of the key itself. In one example, the light emitting element illuminates a key perimeter. In other examples, other portions of the key geometry are illuminated, such as an external surface, a sidewall, a corner, and so on. In further examples, the light emitting element can illuminate spaces between one or more keys and the adjacent structure of a keyboard. For example, an aperture in which a key is disposed illuminates upon activation of the light emitting element, thereby generating a halo around a base of the key.

As noted above, the light emitting element optically couples to illuminable portions of a key via a light guide. In some embodiments, the light guide takes the shape of a ring, although such a shape is not required. The ring-shaped light guide can be fully closed or can be segmented. Such a light guide is formed from an optically translucent (or transparent) material. A body of the light guide can define an inner sidewall, an outer sidewall, a top endcap surface, and a bottom endcap surface. The light emitting element is optically coupled, either directly or indirectly, to the body of the light guide. The endcap surfaces are optically coupled, either directly or indirectly, to the illuminable portions of the key or keycap.

The sidewalls of the light guide exhibit greater internal reflection than the endcap surfaces. In one example, one or more prisms or scallops are formed in the sidewalls and are oriented to reflect light internally (e.g., into the interior of the light guide) whereas an endcap surface is smooth and facilitates transmission of light therethrough. In this manner, light emitted by the light emitting element exits the light guide in a greater quantity and in a more uniform manner through the endcap surfaces, and thus through the illuminable portions of the key, than from the sidewalls of the light guide.

In other embodiments, a light guide can form a structural portion of the key in addition to directing light. In these examples, the light guide also includes one or more internal reflectors (e.g., reflective surface), such as rectilinear through-holes, laser etched or routed channels, insert-molded reflectors, or the like. The internal reflectors are positioned and oriented to direct light (via internal reflection) within the body to selected locations of the top surface and/or the outer sidewall. In some cases, the internal reflectors are oriented oblique to a light emitting element. The internal reflectors direct light around structural features of the body that can cause light to undesirably scatter, leak, or exit the body away from the illuminable portion of the key ("light leakage"). In this manner, light emitted by the light emitting element exits the light guide in a greater quantity and in a more uniform manner through the top surface and/or the outer sidewall (which may, in some embodiments, be smooth and facilitate light transmission therethrough), and thus to the illuminable portion of the key, because less light is lost to leakage.

These and other embodiments are discussed below with reference to FIGS. 1A-9. However, those skilled in the art will readily appreciate that the detailed description given herein with respect to these Figures is for explanatory purposes only and should not be construed as limiting.

Figure 1A:
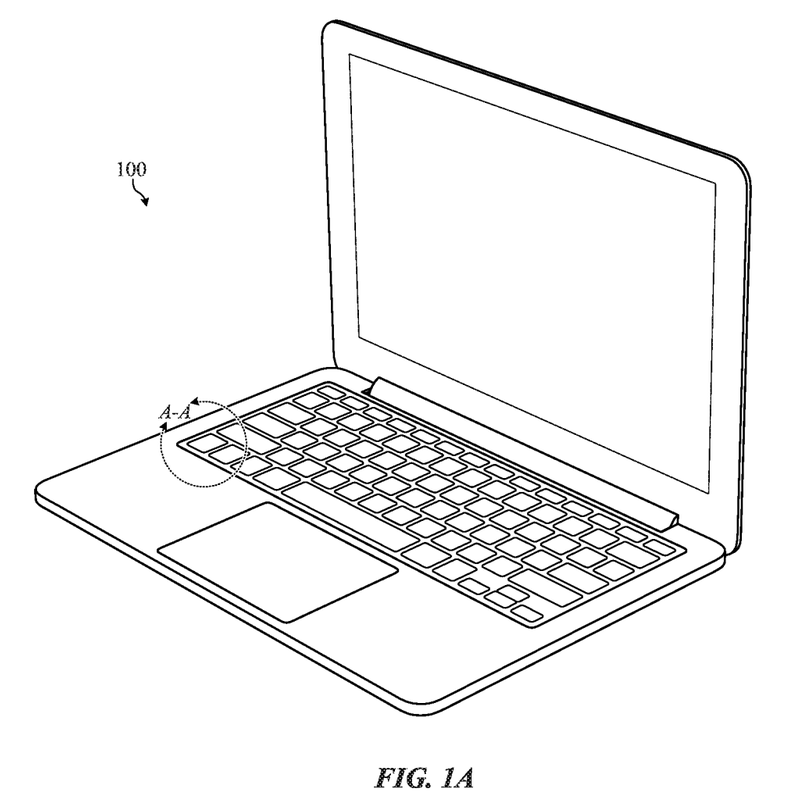
FIG. 1A depicts an electronic device incorporating a keyboard with illuminable keys.
Figure 1B:
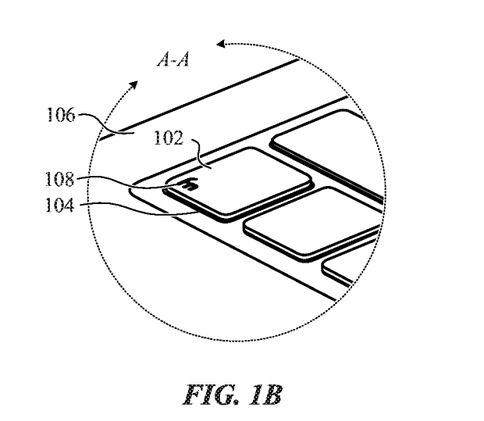
FIG. 1B depicts the enclosed circle A-A of FIG. 1A.

FIG. 1A depicts an electronic device 100 incorporating a keyboard with illuminable keys, such as the illuminable key 102 depicted in a removed view of greater scale identified by the enclosed circle A-A, shown in FIGS. 1A-1B.

The electronic device 100 is a portable laptop computer including an integrated keyboard with illuminable keys, such as an illuminable key 102 or other suitable input structure. The illuminable key 102 at least partially extends through an aperture 104 defined in a housing 106 of the electronic device 100. The illuminable key 102 depresses at least partially into the aperture 104 when a user presses the illuminable key 102. In one example, a top surface of the illuminable key 102 is flush with a top surface of the housing of the electronic device 100 when the illuminable key 102 is fully pressed. Other sample input structures may take the form of buttons, mice, trackpads, touch-sensitive surfaces, and so on.

A structure associated with the illuminable key 102 is disposed at least partially within the aperture 104. This structure, referred to as a "key stack," can include a keycap or similar input surface, a key mechanism, an elastomeric dome, a switch housing, and electronic switch circuitry. The keycap typically defines at least one illuminable portion, depicted in FIG. 1A as a glyph 108.

Figure 2A:
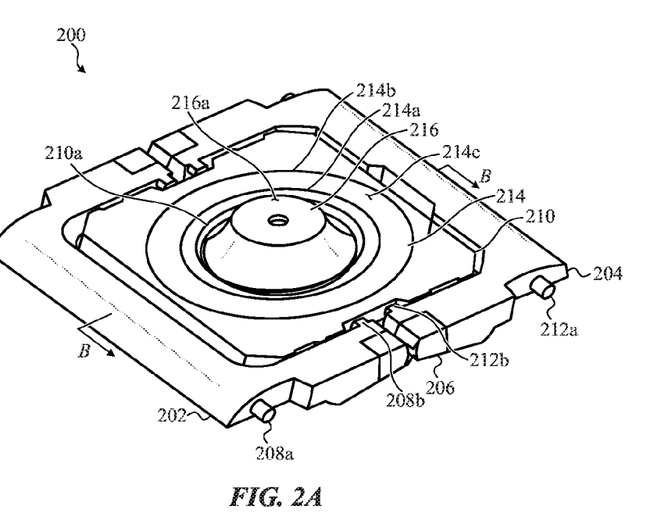
FIG. 2A depicts an example key mechanism that may be used with an illuminable key of the keyboard shown in FIGS. 1A-1B.

FIG. 2A depicts an example key mechanism that may be used with an illuminable key of the keyboard shown in FIGS. 1A-1B (or another suitable input structure). The key mechanism 200 is shown as a depressible mechanism and includes a first wing 202 and a second wing 204 that are coupled together with a hinge 206. The first wing 202 and the second wing 204 are substantially symmetric across the hinge 206. For example, as illustrated the first wing 202 and a second wing 204 are each formed in a U-shape, the free ends of which are coupled by the hinge 206 to form a closed ring. The key mechanism 200 is depicted in a depressed configuration (e.g., the key is pressed by a user). When the depressible mechanism depresses, the wings may flatten or otherwise move toward a base of the mechanism.

In many cases, the hinge 206 is a living hinge formed from a flexible material such as a polymer or elastomer. In other cases, the hinge 206 is a flexible member overmolded onto the first wing 202 and the second wing 204. The flexible member can be formed from metal, fabric, polymer, or the like. In other embodiments, the first wing 202 and the second wing 204 can be formed from an optically translucent material and can be optically coupled to a light emitting element. In this manner, the first wing 202 and the second wing 204 can serve as a portion of a light guide.

Many embodiments include more than one hinge. For example, as depicted, the first wing 202 and the second wing 204 are joined by two hinges.

The first wing 202 and the second wing 204 are typically formed from the same material, although this is not required. For example, in one embodiment, the first wing 202 is formed from a plastic material doped with glass fibers and the second wing is formed from metal. In other embodiments, both the first wing 202 and the second wing 204 are formed from a doped plastic material. In one embodiment, the dopant material can be selected to increase the strength and/or rigidity of the first wing 202 and the second wing 204.

Both the first wing 202 and the second wing 204 include geometry configured to interlock with one or more other structural portions of the key mechanism 200. For example, the first wing 202 includes a keycap pivot 208a that interlocks with and/or slides within a portion of a keycap (or other such input surface) positioned above the depressible mechanism 200. The first wing 202 also includes a structural pivot 208b that interlocks with and/or slides within a portion of a structural body 210. Similarly, the second wing 204 includes a keycap pivot 212a that interlocks with and/or slides within a portion of the keycap. The second wing 204 also includes a structural pivot 212b that interlocks with and/or slides within a portion of the structural body 210.

The structural body 210 is formed from a rigid material such as plastic or metal. As with the first wing 202 and the second wing 204, the structural body 210 can be formed from a doped material. The structural body 210 can be formed from an optically transparent or translucent material although this is not required of all embodiments. In one example, the structural body 210 can be formed from an optically opaque material. In other embodiments, the structural body 210 can be formed from a translucent material that takes a particular color.

A light guide 214 is positioned within the structural body 210. The light guide 214, and as illustrated, is shaped as a closed ring, although such a configuration is not required. For example, the light guide 214 can take a square shape, a rectangular shape, a grid shape, or any other shape or combination of shapes. In still further examples, the light guide 214 is formed as a segmented shape, such as a segmented ring.

The light guide 214 is formed from an optically translucent or transparent material such as acrylic, glass, or plastic. In many examples, the light guide 214 is insert-molded into the structural body 210. In other embodiments, the light guide 214 is co-molded with the structural body 210. In still further examples, the light guide 214 is molded into a light guide cavity that is defined within the structural body 210.

As noted above, the light guide 214 includes a body that defines an inner sidewall 214a, an outer sidewall 214b, a top endcap surface 214c, and a bottom endcap surface (not visible in FIG. 2A). The inner sidewall 214a and the outer sidewall 214b of the light guide 214 exhibit greater internal reflection than the endcap surfaces, such as the top endcap surface 214c. In this manner, light emitted into the light guide 214 by a light emitting element (see, e.g., FIG. 2B) will exit the light guide 214 in a greater quantity and in a more uniform manner through the top endcap surface 214c than through any other portion of the light guide 214. In some examples, the top endcap surface 214c is optically diffusive.

The light guide 214 is optically coupled, either directly or indirectly, to one or more illuminable portions of the key. In one example, the light guide 214 is optically coupled to the glyph 108 of the illuminable key 102 depicted in FIGS. 1A-1B. With respect to the orientation shown in FIG. 1B, the light guide 214 emits light toward the bottom left hand portion of the illuminable key 102. For example, in place of a ring configuration such as depicted in FIG. 2A, the top endcap surface 214c of the light guide 214 can take a circular shape, positioned in the leftmost corner of the structural body 210 so that the top endcap surface 214c is positioned substantially below the glyph 108 of the illuminable key 102 depicted in FIGS. 1A-1B. For other glyphs taking other shapes, the light guide 214 can take a different shape. In this manner, the shape and size of the light guide 214 is selected based on the geometry of the illuminable portion to which the light guide 214 is optically coupled.

The light guide 214 can be disposed around an aperture defined in the structural body 210. For example, in one embodiment the structural body 210 defines a through-hole 210a. As illustrated, the through-hole 210a is circular, although this is not required and the through-hole can take other shapes. A compressible dome 216 is disposed within the through-hole 210a. In some embodiments, the compressible dome 216 is formed from an elastomeric material (e.g., is an elastomeric dome), although this is not required. Likewise, the compressible or collapsible dome 216 may be formed from a transparent or translucent material. For example, the compressible dome 216 is formed from an optically opaque material. In other examples, the compressible dome is formed from an optically translucent material of a particular color (e.g., white). In some embodiments, the compressible/collapsible dome may be replaced by a different structure, including various mechanical, electrical, and/or electromechanical switches. Likewise, the dome may be replaced by a structure designed to provide a particular feedback or feel to the user as the key (or other input surface) is pressed. For example, the dome may be replaced by a spring, a bi-stable element, and so on.

In some embodiments, the compressible dome 216 extends a certain distance above a top surface of the structural body 210. In other embodiments, the compressible dome 216 is flush with a top surface of the structural body 210.

In many embodiments, a top surface 216a of the compressible or otherwise collapsible dome 216 interfaces with the underside of the keycap (or other such input surface) of the illuminable key. In one example, the underside of the keycap includes a projection that contacts the top surface 216a of the compressible dome 216. In other cases, the underside of the keycap can include an indentation that receives the top surface 216a of the compressible dome 216. The compressible dome 216 collapses into the through-hole 210a to activate the electronic switch circuitry associated with the illuminable key in response to a user press of the keycap.

For simplicity of illustration, the depressible mechanism 200 is depicted in a depressed configuration (e.g., when the key is pressed by a user), depicting the first wing 202 and the second wing 204 fully extended. In an upward configuration, the outermost portions of the first wing 202 and the second wing 204 extend above the structural body 210, pivoting relative to one another and relative to the structural body 210 at the hinge 206.

Figure 2B:
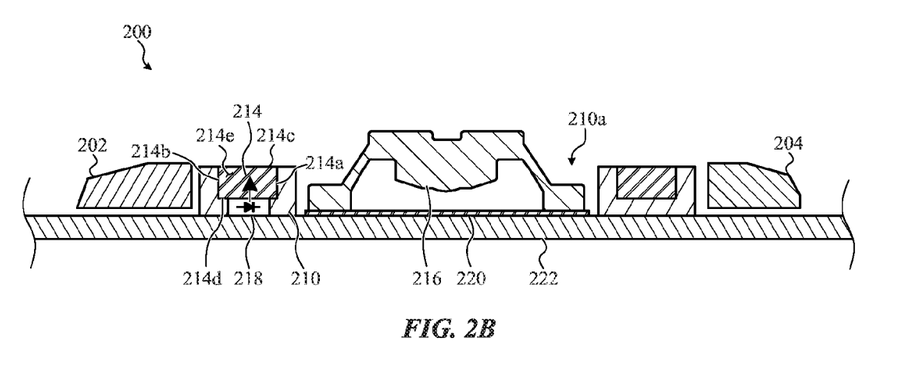
FIG. 2B depicts a cross-section view of the key mechanism of FIG. 2A taken along line B-B of FIG. 2A, particularly showing an example light guide.

FIG. 2B depicts a cross-section view of the key mechanism (e.g., sample input structure) of FIG. 2A taken along line B-B of FIG. 2A. As depicted in FIG. 2A, the first wing 202 and the second wing 204, when coupled by the hinge(s), define an internal area in which the structural body 210 is positioned. The light guide 214 is disposed within a portion of the structural body 210. As illustrated, the top endcap surface 214c is substantially flush with a top surface of the structural body 210, although such a configuration is not required. For example, in some embodiments the top endcap surface 214c extends proud of the top surface of the structural body 210. In other examples, the top endcap surface 214c is inset into the structural body 210.

In some embodiments, the light guide 214 extends partially, but not entirely, through the structural body 210. More particularly, a bottom endcap surface 214d of the light guide 214 mates with an internal portion of the structural body 210. In other embodiments, the bottom endcap surface 214d can extend through the entire depth of the structural body 210.

Although the bottom endcap surface 214d is illustrated as substantially parallel to the top endcap surface 214c, such a configuration is not required. For example, the bottom endcap surface 214d can be oblique to the top endcap surface 214c.

As noted above, the light guide 214 can include a body 214e. The body 214e is optically coupled, either directly or indirectly, to a light emitting element 218. As illustrated, the body 214e is optically coupled to the light emitting element 218 through the bottom endcap surface 214d. In other embodiments, the light emitting element 218 can be optically coupled to the light guide 214 at a different location. In other examples, the light emitting element 218 can be optically coupled to the light guide 214 indirectly, such as via a light pipe.

The light emitting element 218 includes one or more light-emitting diodes. The light-emitting diodes emit light of a particular color and at a particular brightness. In some embodiments, the light emitting element 218 provides light of a variable color or a variable brightness. In one example, the light emitting element 218 emits white light having a cool color temperature, although this is not required.

An electrical switch layer 220 is also depicted in FIG. 2B. The electrical switch layer 220 is disposed below the compressible or otherwise collapsible dome 216 such that an electrical property of the electrical switch layer 220 changes when the compressible dome 216 compresses. In one example, the compressible dome 216 can complete an electrical contact between electrical traces or contacts disposed on the electrical switch layer 220 when the compressible dome 216 is compressed. The electrical traces are organized in an interleaved comb pattern or a concentric circular pattern. In other embodiments, the compressible dome 216 can cause a change in a capacitance measured between one or more portions of the electrical switch layer 220 when the compressible dome 216 compresses (or, put another way, a collapsible dome collapses).

The key mechanism 200 (or another example of a depressible mechanism) is disposed onto a substrate 222. The substrate 222 can be positioned within a housing of an electronic device, such as the electronic device 100 depicted in FIGS. 1A-1B. In other embodiments, the substrate 222 can be positioned within an aperture defined by the housing of an electronic device. In one example, the substrate 222 is formed from a rigid material such as metal or plastic.

As noted with respect to other embodiments described herein, the inner sidewall 214a and the outer sidewall 214b of the light guide 214 exhibit greater internal reflection than the top endcap surface 214c and the bottom endcap surface 214d. More particularly, the internal reflection of light vectored toward a sidewall of the light guide 214 may be greater than the internal reflection of light vectored toward an endcap of the light guide. In an alternate and non-limiting phrasing, the sidewalls of the light guide 214 may be more optically reflective than the endcaps of the light guide 214.

As may be appreciated, the reflectivity of a surface may depend upon the angle of incidence with which light strikes the surface and the difference between the refractive indices of the materials interfacing at the surface. More specifically, at the boundary between the light guide 214 and another material (e.g., air, the structural body 210, the keycap, and so on) having a lower refractive index than that of the light guide 214, light within the light guide 214 may be reflected internally. If the angle of incidence of the light is sufficiently high, total internal reflection may occur (e.g., almost zero light passes through the boundary; effectively all light reflects back into the body 214e). Thus, in some cases, the inner sidewall 214a and the outer sidewall 214b can exhibit total internal reflection. In some embodiments, the bottom endcap surface 214d may also exhibit greater internal reflection than the top endcap surface 214c.

For these embodiments, most of the light emitted into the light guide 214 by the light emitting element 218 will either reflect off the inner sidewall 214a and/or the outer sidewall 214b (and/or the bottom endcap surface 214d), or will exit the light guide 214 through the top endcap surface 214c. Similarly, for ring-shaped light guides, internal reflection of light can cause light to be emitted in a substantially uniform manner across the entire surface of the top endcap surface 214c. More specifically, the portion of the top endcap surface 214c that is diametrically opposite the light emitting element 218 (e.g., the farthest point away from the light emitting element 218, as illustrated in FIG. 2A) can emit a quantity of light substantially similar to the other portions of the top endcap surface 214c. In this manner, the light guide 214 facilitates substantially uniform emission of light from its body.

As a result, the illuminable portions of the key to which the light guide 214 is optically coupled (either directly or indirectly) are illuminated in a substantially uniform manner. Likewise, other suitable input structures may be illuminated in this fashion.

Figure 3:
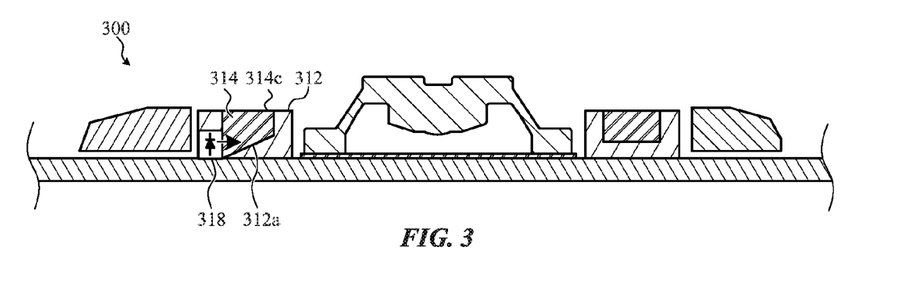
FIG. 3 depicts a cross-section view of the key mechanism of FIG. 2A taken along line B-B of FIG. 2A, particularly showing another example light guide.

FIG. 3 depicts a cross-section view of the key mechanism of FIG. 2A taken along line B-B of FIG. 2A, showing another example light guide. As with the embodiment depicted in FIG. 2A, a light guide 314 can be disposed at least partially within a structural body 312 of a key mechanism 300, or other depressible mechanism. The light guide 314 is optically coupled, either directly or indirectly, to a light emitting element 318. The light emitting element 318 is positioned to emit light into a sidewall (e.g., outer sidewall) of the light guide 314. A reflective feature 312a of the structural body 312 is positioned adjacent to and/or within the light emission path of the light emitting element 318.

In many embodiments, the reflective feature 312a is a substantially flat surface that is oblique to the light emitting element 318. In one embodiment, the reflective feature 312a is oriented toward a top endcap surface 314c of the light guide 314 at a 45-degree angle to the light emitting element 318. The reflective feature 312a can be coated with a reflective coating such as a metalized ink.

The angle of the reflective feature 312a can be selected, at least in part, to increase or maximize the total internal reflection of light emitting from the light emitting element 318. In such an embodiment, the structural body 312 and the light guide 314 can be formed from materials having different refractive indices. More particularly, the structural body 312 may have a lower refractive index $n_2$ than the refractive index $n_1$ of the light guide 314. Once the refractive indices of the structural body 312 and the light guide 314 are known, an incident angle $\theta_i$ at which total internal reflection occurs (the "critical angle") can be determined by the following equation:

$$\theta_i = \arcsin(n_2/n_1) \quad \text{Equation 1}$$

Once the incident angle $\theta_i$ is determined, the minimum angle of the reflective feature 312a can be determined. In this manner, the amount of light lost to absorption within the structural body 312 is substantially reduced. In other words, the volume of light that exits the top endcap surface 315c is increased.

In some embodiments, the reflective feature 312a can be implemented as a chamfer formed in the inner sidewall of the light guide. In other embodiments, the reflective feature 312a is a non-flat surface such as a convex surface, a concave surface, or a domed surface.

In other embodiments, the light emitting element 318 is positioned elsewhere. For example, in one embodiment, the light emitting element 318 is optically coupled to an internal sidewall of the light guide. In other embodiments, such as depicted in FIG. 2B, the light emitting element 318 is coupled to a bottom surface (e.g., bottom endcap surface) of the light guide. In still other embodiments, the light emitting element 318 is optically coupled to the top endcap surface 314c of the light guide 314. In these and related embodiments, one or more reflective features, such as the reflective feature 312a, can be formed within the structural body 312 to direct light emitted from the light emitting element 318 in a particular direction.

Figure 4:
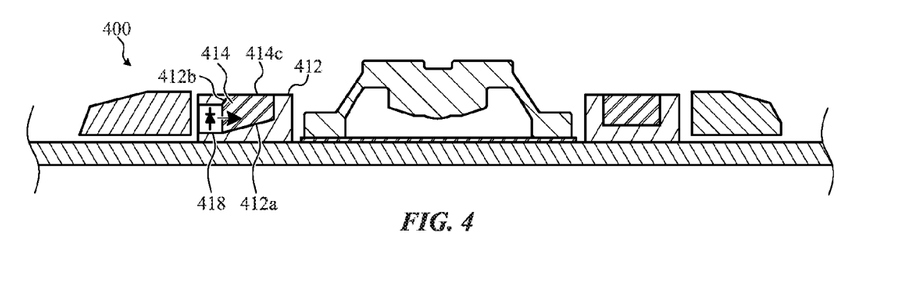
FIG. 4 depicts a cross-section view of the key mechanism of FIG. 2A taken along line B-B of FIG. 2A, particularly showing another example light guide.

FIG. 4 depicts a cross-section view of the key mechanism of FIG. 2A taken along line B-B of FIG. 2A, showing another example light guide. As with the embodiment depicted in FIG. 2A, a light guide 414 can be disposed at least partially within a structural body 412 of a key mechanism 400. The light guide 414 is optically coupled, either directly or indirectly, to a light emitting element 418.

As with the embodiment depicted in FIG. 3, the light emitting element 418 is positioned to emit light into a sidewall (e.g., outer sidewall) of the light guide 414. A first reflective feature 412a and a second reflective feature 412b of the structural body 412 are positioned adjacent to the light emitting element 418. In many embodiments, the reflective features 412a, 412b are substantially flat surfaces that are oriented oblique to the light emitting element 418. In one embodiment, the reflective feature 412a is angled toward a top endcap surface 414c of the light guide 414 at a 45-degree angle to the light emitting element 418. The reflective feature 412a can be coated with a reflective coating such as a metalized ink. In other examples, the angle of the reflective feature 412a is selected, at least in part, to maximize the total internal reflection of light emitting from the light emitting element 418.

As with the embodiment depicted in FIG. 3, Equation 1 may be used to determine or approximate the angle(s) of the reflective features 412a, 412b.

Figure 5:
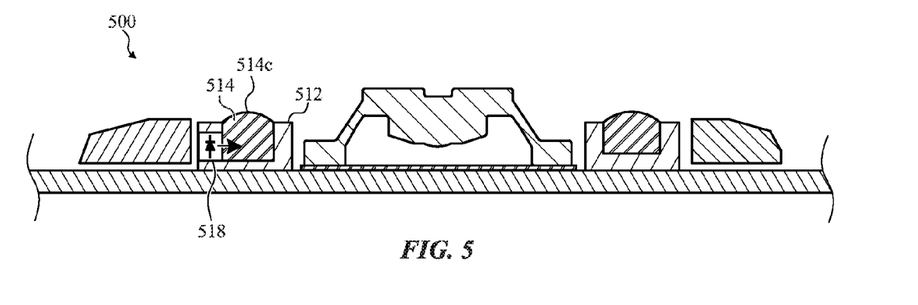
FIG. 5 depicts a cross-section view of the key mechanism of FIG. 2A taken along line B-B of FIG. 2A, particularly showing another example light guide.

FIG. 5 depicts a cross-section view of the key mechanism of FIG. 2A taken along line B-B of FIG. 2A, showing another example light guide. As with the embodiment depicted in FIG. 2A, a light guide 514 can be disposed at least partially within a structural body 512 of a key mechanism 500. The light guide 514 is optically coupled, either directly or indirectly, to a light emitting element 518. In the illustrated embodiment, the light guide 514 can include a partially domed surface, identified as the top endcap surface 514c.

It may be appreciated that the embodiments depicted in FIGS. 2B and 3-5 are not exhaustive. For example, in some embodiments, the various features depicted in FIG. 5 can be incorporated into an embodiment incorporating features depicted and described with respect to FIG. 3. Other embodiments can include additional reflective surfaces other than those shown. For example, as noted above, many embodiments described herein employ a light guide with its sidewalls formed to exhibit greater internal reflection than its endcap surfaces.

Figure 6A:
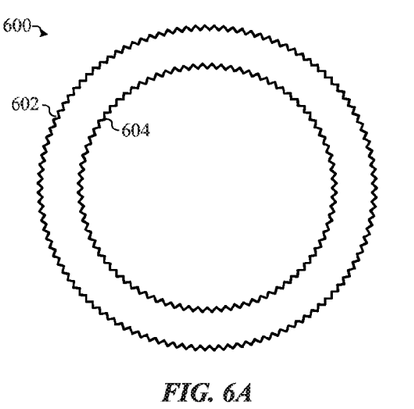
FIG. 6A depicts an example light guide having a prismatic sidewall.
Figure 6B:
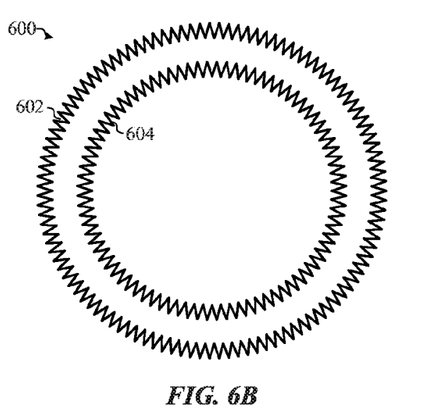
FIG. 6B depicts another example light guide having a prismatic sidewall.
Figure 6C:
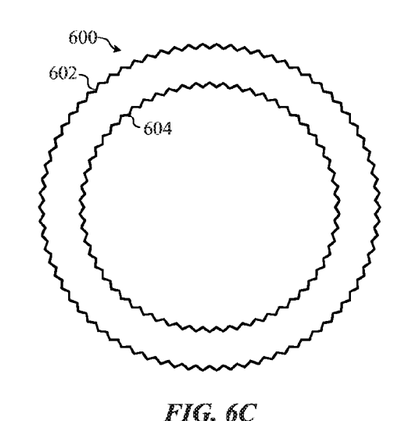
FIG. 6C depicts still another example light guide having a prismatic sidewall.
Figure 6D:
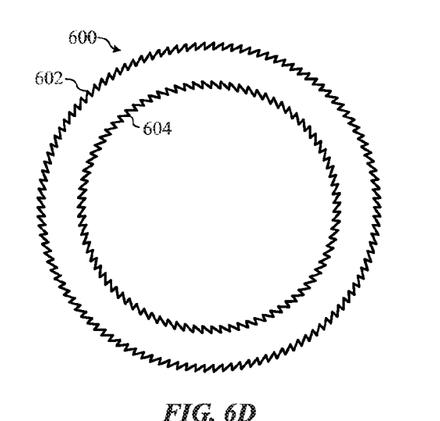
FIG. 6D depicts yet another example light guide having an internally scalloped sidewall.

FIG. 6A depicts an example ring-shaped light guide 600 having an external prismatic sidewall 602 and an internal prismatic sidewall 604. The external prismatic sidewall 602 and the internal prismatic sidewall 604 exhibit a repeating pattern of triangular prisms. In some embodiments, the depth of the external prismatic sidewall 602 and the internal prismatic sidewall 604 can be varied, such as shown in FIG. 6B. In other embodiments, the number of triangular prisms can be varied, such as shown in FIG. 6C. In other embodiments, the shape of the prisms can be changed. For example, as shown in FIG. 6D, the external prismatic sidewall 602 can take a saw tooth (e.g., serrated) shape. In such an embodiment, the internal prismatic sidewall 604 can also take a saw tooth shape. In some cases, the internal prismatic sidewall 604 can be oriented oppositely from the external prismatic sidewall 602. In this manner, light within the ring-shaped light guide 600 can be directed in a substantially counterclockwise direction.

As with other embodiments described herein, the geometry of the prismatic sidewalls of a light guide can be determined or approximated, at least in part, based on the refractive index of the material selected for the light guide.

Figure 6E:
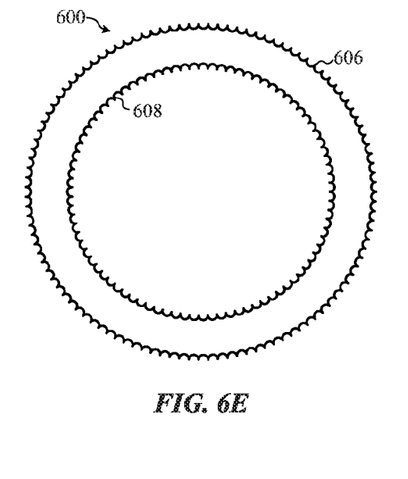
FIG. 6E depicts a further example light guide having an externally scalloped sidewall.
Figure 6F:
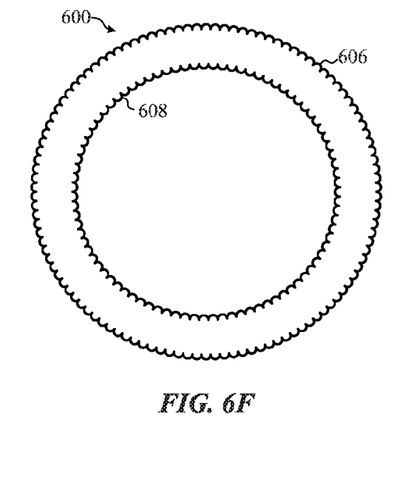
FIG. 6F depicts an example ring-shaped light guide having an internally-scalloped sidewall.

In other embodiments, the sidewalls of the light guides can take other shapes. For example, in some embodiments, such as depicted in FIGS. 6E-6F, a ring-shaped light guide 600 can include scalloped sidewalls. As with prismatic sidewalls depicted in FIGS. 6A-6D, the scalloped sidewalls 606, 608 can take any number of specific shapes. For example, the depth, size, width, radius, and orientation of the scallops can vary from embodiment to embodiment.

Figure 7A:
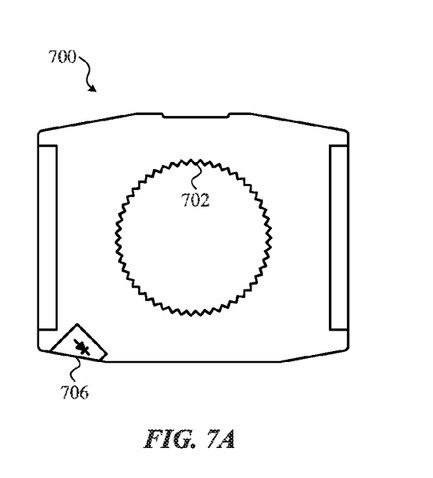
FIG. 7A depicts an example light guide defining a prismatic through-hole.

As noted above, in other embodiments, a light guide of an illuminable key can form a portion of the structure of the key itself. For example, FIG. 7A depicts an example light guide that serves a dual purpose of directing light to an illuminable portion of a key and providing structural support to one or more portions of the key. The light guide 700 can take the shape of a structural body, such as the structural body 210 depicted in FIGS. 2A-2B. The light guide 700 includes a through-hole 702. A compressible dome, such as the compressible dome 216 depicted in FIGS. 2A-2B can be inserted into the through-hole 702. A light emitting element 706 is disposed at one corner of the light guide 700 to emit light into the light guide 700.

As with other embodiments described herein, the light guide 700 is made from an optically translucent or transparent material such as plastic, glass, doped plastic or glass, sapphire, zirconia or the like. The light guide 700 is formed from a material with a known or determinable refractive index.

Figure 7B:
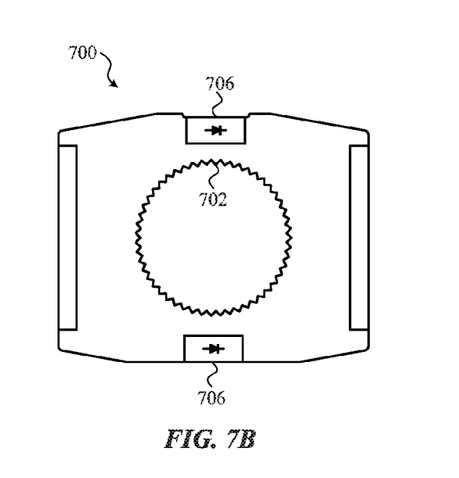
FIG. 7B depicts another example light guide defining a prismatic through-hole.

In other embodiments, the light emitting element 706 can be disposed in other locations along the light guide 700. In one embodiment, more than one light emitting element can be used. For example, FIG. 7B depicts an embodiment with two light emitting elements, each labeled as a light emitting element 706.

Figure 7C:
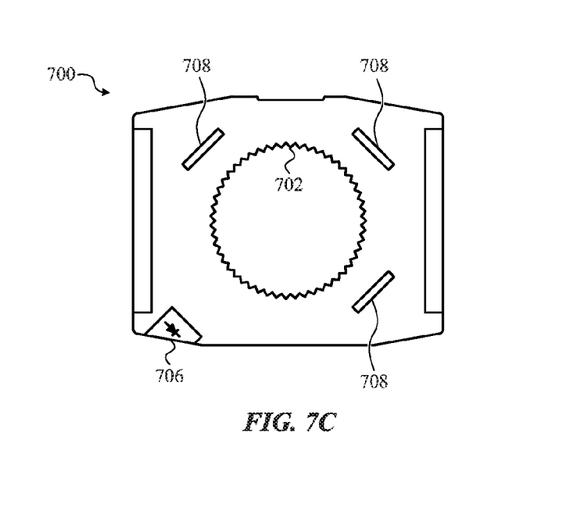
FIG. 7C depicts another example light guide defining a prismatic through-hole and three internal reflective surfaces.

The through-hole 702 can have a greater internal reflectance than other surfaces of the light guide 700. For example, the through-hole 702 can include a prismatic sidewall, such as shown and described with respect to FIGS. 6A-6D and as illustrated in FIGS. 7A-7C. In other embodiments, the through-hole 702 can include a scalloped sidewall, such as shown and described with respect to FIGS. 6E-6F.

In still further examples, the light guide 700 can include an internally reflective feature 708. In one embodiment, the internally reflective feature 708 can be implemented as a rectilinear through-hole, a laser etched or routed channel, an insert-molded reflector, or the like. For example, as shown in FIG. 7C, three internally-reflective features are depicted, positioned and oriented to direct light (via internal reflection) within the body of the light guide 700. In this manner, the internally reflective features direct light around structural features of the body, such as the through-hole 702. Although the internally reflective features 708 are depicted as rotated at 45 degrees, one may appreciate that different embodiments can orient the internally reflective feature 708 at different angles.

Figure 8:
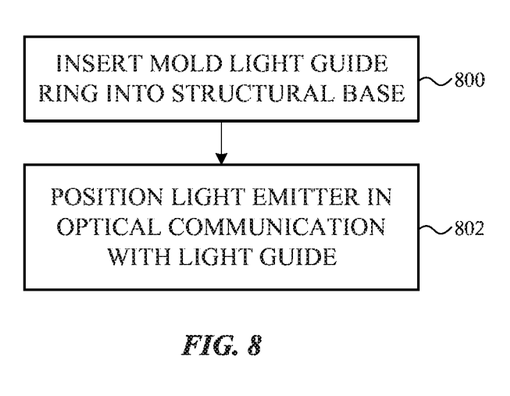
FIG. 8 is a flow chart depicting operations of a method of manufacturing a light guide.

FIG. 8 is a flow chart depicting operations of a method of manufacturing a light guide. The method can begin at operation 800 in which a light guide is insert-molded into a structural base of a key stack. Next, at operation 802, a light emitter, such as a light-emitting diode, is positioned in optical communication with the light guide.

Figure 9:
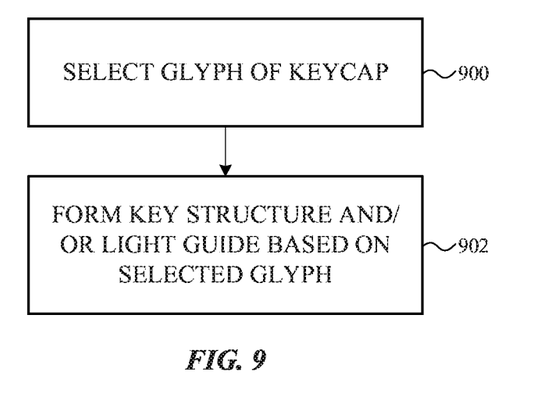
FIG. 9 is a flow chart depicting operations of a method of manufacturing a light guide based on a selected glyph.

FIG. 9 is a flow chart depicting operations of a method of manufacturing a light guide based on a selected glyph. The method begins at operation 900 at which a glyph is selected. Next at operation 902, the light guide and/or key structure are formed based on the shape and location of the selected glyph (or glyphs).

Although many embodiments described and depicted herein reference light guides for illuminable keys of a keyboard, it should be appreciated that other implementations can take other form factors. Thus, the various embodiments described herein, as well as functionality, operation, components, and capabilities thereof may be combined with other elements as necessary, and so any physical, functional, or operational discussion of any element or feature is not intended to be limited solely to a particular embodiment to the exclusion of others.

For example, although the electronic device 100 is shown in FIGS. 1A-1B as a laptop computer, it may be appreciated that other electronic devices are contemplated. For example, the electronic device 100 can be implemented as a peripheral input device, a desktop computing device, a handheld input device, a tablet computing device, a cellular phone, a wearable device, and so on.

Further, it may be appreciated that the electronic device 100 can include one or more components that interface or interoperate, either directly or indirectly, with the illuminable key 102 which, for simplicity of illustration are not depicted in FIGS. 1A-1B. For example, the electronic device 100 may include a processor coupled to or in communication with a memory, a power supply, one or more sensors, one or more communication interfaces, and one or more input/output devices such as a display, a speaker, a rotary input device, a microphone, an on/off button, a mute button, a biometric sensor, a camera, a force and/or touch sensitive trackpad, and so on.

In some embodiments, the communication interfaces provide electronic communications between the electronic device 100 and an external communication network, device or platform. The communication interfaces can be implemented as wireless interfaces, Bluetooth interfaces, universal serial bus interfaces, Wi-Fi interfaces, TCP/IP interfaces, network communications interfaces, or any conventional communication interfaces. The electronic device 100 may provide information related to externally connected or communicating devices and/or software executing on such devices, messages, video, operating commands, and so forth (and may receive any of the foregoing from an external device), in addition to communications. As noted above, for simplicity of illustration, the electronic device 100 is depicted in FIGS. 1A-1B without many of these elements, each of which may be included, partially, optionally, or entirely, within a housing 106.

In some embodiments, the housing 106 can be configured to, at least partially, surround a display. In many examples, the display may incorporate an input device configured to receive touch input, force input, and the like and/or may be configured to output information to a user. The display can be implemented with any suitable technology, including, but not limited to, a multi-touch or multi-force sensing touchscreen that uses liquid crystal display (LCD) technology, light-emitting diode (LED) technology, organic light-emitting display (OLED) technology, organic electroluminescence (OEL) technology, or another type of display technology.

The housing 106 can form an outer surface or partial outer surface and protective case for the internal components of the electronic device 100. In the illustrated embodiment, the housing 106 is formed in a substantially rectangular shape, although this configuration is not required. The housing 106 can be formed of one or more components operably connected together, such as a front piece and a back piece or a top clamshell and a bottom clamshell. Alternatively, the housing 106 can be formed of a single piece (e.g., uniform body or unibody).

Various embodiments described herein can be incorporated with other systems or apparatuses and may not, in all cases, be directly associated with an input device configured for use with an electronic device such as depicted in FIGS. 1A-1B. For example, a light guide as described herein can be incorporated into an independent electronic switch such as a button (e.g., light switch, automotive button, doorbell, and so on). In other examples, a light guide as described herein can be incorporated into a different portion of an electronic device, such as a display element of an electronic device. In such an example, a light guide incorporating prismatic or scalloped sidewalls can be used as a backlight diffuser within a display stack-up.

Additionally, it may be appreciated that for illuminable key embodiments the various structures and mechanisms described herein are not intended to limit the disclosure to a particular favored or required geometry or form factor. For example, an illuminable key can include a butterfly mechanism, a scissor mechanism, or any other suitable type of key mechanism. An illuminable key can include a keycap that is formed to have a substantially flat top surface or, in other embodiments, to have a partially curved top surface. An electronic switch associated with the illuminable key can be implemented as a single throw switch, a multi-throw switch, a capacitive switch, and so on. A tactile feedback structure associated with the illuminable key can be implemented as an elastomeric dome, a spring, an elastomer deposit, a metal dome, or any combination thereof.

Furthermore, one may appreciate that although many embodiments are disclosed above, that the operations and steps presented with respect to methods and techniques described herein are meant as exemplary and accordingly are not exhaustive. One may further appreciate that an alternate step order or fewer or additional steps may be implemented in particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A key for a keyboard comprising:
a keycap disposed within an aperture defined by the keyboard;
a structural body positioned beneath the keycap and defining an opening, the structural body formed from an optically translucent material;
a compressible dome positioned below the keycap and at least partially within the opening of the structural body;
a key mechanism coupled to the keycap and pivotally engaged with a sidewall of the structural body; and
a light emitting element optically coupled to the structural body.

2. The key of claim 1, wherein the structural body has a prismatic sidewall within the opening.

3. The key of claim 2, wherein the structural body comprises an internally reflective surface.

4. The key of claim 3, wherein the internally reflective surface comprises a rectilinear through-hole.

5. The key of claim 2, wherein the structural body comprises a light guide.

6. A key comprising:
a keycap defining an input surface of the key;
a compressible dome below the keycap;
a light emitting element;
a light guide optically coupled to the light emitting element and defining:
an opening at least partially surrounding the compressible dome; and
an interlock feature positioned on a sidewall of the light guide; and
a key mechanism engaged with the interlock feature and with the keycap and configured to guide the keycap between a depressed position and an undepressed position.

7. The key of claim 6, wherein the keycap comprises an illuminable portion.

8. The key of claim 7, wherein the illuminable portion comprises a glyph formed from an optically translucent material.

9. The key of claim 7, wherein the key mechanism at least partially surrounds the light emitting element.

10. The key of claim 9, wherein the key mechanism comprises a butterfly mechanism.

11. The key of claim 6, wherein the light guide forms a ring.

12. The key of claim 6, wherein:
the sidewall is an outer sidewall; and
the light guide comprises:
a top endcap surface;
a bottom endcap surface; and
an inner sidewall extending from the top endcap surface to the bottom endcap surfaces and having a greater internal reflection than the top endcap surface.

13. The key of claim 12, wherein the outer sidewall has a greater internal reflection than the top endcap surface.

14. The key of claim 12, wherein each of the inner sidewall and the outer sidewall form one or more prisms.

15. An input structure for an electronic device, comprising:
an input surface comprising an illuminable portion;
a collapsible dome positioned below the input surface;
a depressible mechanism positioned around the collapsible dome and coupled to the input surface, the depressible mechanism configured to move the input surface downward to collapse the collapsible dome in response to an external force on the input surface;
a body coupled to the depressible mechanism and the collapsible dome;
a light guide positioned around the collapsible dome and within the body, the light guide optically coupled to the illuminable portion; and
a light emitting element optically coupled to the light guide and configured to illuminate the illuminable portion through the light guide.

16. The input structure of claim 15, wherein the light guide defines an inner sidewall and an outer sidewall.

17. The input structure of claim 16, wherein the light guide is optically coupled to the light emitting element.

18. The input structure of claim 16, wherein the inner sidewall and the outer sidewall of the light guide each form a series of prisms.

19. The input structure of claim 15, wherein the light guide is insert-molded into the body.

20. The input structure of claim 15, wherein the body comprises a reflective surface that is oblique to the light emitting element.

21. The key of claim 1, wherein the key mechanism at least partially surrounds the structural body when the key is in a depressed configuration.

22. The key of claim 6, wherein the key mechanism at least partially surrounds the light guide when the key is in a depressed configuration.

* * * * *